(12) United States Patent
Dinkel

(10) Patent No.: US 11,001,245 B2
(45) Date of Patent: May 11, 2021

(54) ADD-ON MODULE FOR AN ELECTROHYDRAULIC BRAKE ASSEMBLY, AND BRAKE ASSEMBLY SYSTEM COMPRISING AN ADD-ON MODULE OF SAID TYPE

(71) Applicant: Continental Teves AG & Co. oHG, Frankfurt (DE)

(72) Inventor: Dieter Dinkel, Schwalbach (DE)

(73) Assignee: Continental Teves AG & Co. oHG

( * ) Notice: Subject to any disclaimer, the term of this patent is extended or adjusted under 35 U.S.C. 154(b) by 91 days.

(21) Appl. No.: 16/070,340

(22) PCT Filed: Jan. 20, 2017

(86) PCT No.: PCT/EP2017/051171
§ 371 (c)(1),
(2) Date: Jul. 16, 2018

(87) PCT Pub. No.: WO2017/144201
PCT Pub. Date: Aug. 31, 2017

(65) Prior Publication Data
US 2019/0016321 A1 Jan. 17, 2019

(30) Foreign Application Priority Data

Feb. 26, 2016 (DE) .................... 10 2016 203 119.8

(51) Int. Cl.
*B60T 13/58* (2006.01)
*B60T 13/62* (2006.01)
(Continued)

(52) U.S. Cl.
CPC ............ *B60T 13/62* (2013.01); *B60T 8/4081* (2013.01); *B60T 13/161* (2013.01);
(Continued)

(58) Field of Classification Search
CPC ..... B60T 8/17; B60T 8/36; B60T 8/94; B60T 13/58; B60T 13/62; B60T 13/161; B60T 13/662; B60T 13/686; B60T 13/745
(Continued)

(56) References Cited

U.S. PATENT DOCUMENTS 5,921,640 A * 7/1999 Mortimer ................ B60T 8/266
303/113.4
5,924,775 A * 7/1999 Steffes .................. B60T 8/4881
303/10
(Continued)

FOREIGN PATENT DOCUMENTS

CN 101039829 A 9/2007
DE 10023301 A1 1/2001
(Continued)

OTHER PUBLICATIONS

Notice of Reasons for Refusal for Japanese Application No. 2018-543334, dated Aug. 7, 2019, with translation, 12 pages.
(Continued)

*Primary Examiner* — Christopher P Schwartz
(74) *Attorney, Agent, or Firm* — RatnerPrestia

(57) ABSTRACT

An auxiliary module for an electrohydraulic brake assembly, in particular for use in highly automated driving, including a hydraulics unit with a pressure provision device for building up pressure in at least two brakes, wherein at least one reservoir for brake fluid is integrated into the hydraulics unit, and a brake assembly system having an auxiliary module.

18 Claims, 10 Drawing Sheets

(51) Int. Cl.
*B60T 8/40* (2006.01)
*B60T 13/16* (2006.01)
*B60T 13/68* (2006.01)
*B60T 8/36* (2006.01)

(52) U.S. Cl.
CPC ............ *B60T 13/686* (2013.01); *B60T 8/368* (2013.01); *B60T 2270/413* (2013.01)

(58) Field of Classification Search
USPC .................. 303/10, 11, 113.1–113.5, 114.1, 303/116.1–116.4, 119.3
See application file for complete search history.

(56) References Cited

U.S. PATENT DOCUMENTS

| | | | | |
|---|---|---|---|---|
| 5,997,106 | A * | 12/1999 | Takayama | B60T 7/042 303/10 |
| 6,428,121 | B1 * | 8/2002 | Dinkel | B60T 8/368 303/1 |
| 7,004,552 | B2 | 2/2006 | Takumori et al. | |
| 7,517,027 | B2 * | 4/2009 | Aoki | B60T 13/145 188/359 |
| 8,857,922 | B2 * | 10/2014 | Dinkel | B60T 13/141 303/10 |
| 9,020,712 | B2 | 4/2015 | Koike et al. | |
| 9,109,613 | B2 | 8/2015 | Ito | |
| 9,145,119 | B2 | 9/2015 | Biller et al. | |
| 9,308,905 | B2 * | 4/2016 | Biller | B60T 8/4081 |
| 9,415,758 | B2 | 8/2016 | Drumm et al. | |
| 10,137,877 | B2 * | 11/2018 | Feigel | B60T 8/4081 |
| 10,391,994 | B2 * | 8/2019 | Drumm | B60T 13/686 |
| 2004/0004393 | A1 | 1/2004 | Richard | |
| 2010/0219679 | A1 * | 9/2010 | Toyohira | B60T 8/4081 303/20 |
| 2010/0282549 | A1 * | 11/2010 | Feigel | B60T 8/4072 188/110 |
| 2014/0110997 | A1 * | 4/2014 | Biller | B60T 8/4081 303/9.62 |
| 2014/0152085 | A1 | 6/2014 | Biller et al. | |
| 2014/0203626 | A1 * | 7/2014 | Biller | B60T 8/17 303/10 |
| 2015/0151726 | A1 | 6/2015 | McClain et al. | |
| 2015/0239444 | A1 | 8/2015 | Koyama et al. | |
| 2016/0339885 | A1 | 11/2016 | Linhoff et al. | |
| 2017/0096130 | A1 * | 4/2017 | Drumm | B60T 8/3655 |
| 2017/0129468 | A1 | 5/2017 | Besier et al. | |
| 2017/0232947 | A1 | 8/2017 | Heise et al. | |
| 2018/0065609 | A1 * | 3/2018 | Leiber | B60T 8/368 |
| 2018/0265060 | A1 * | 9/2018 | Maruo | B60T 8/3685 |

FOREIGN PATENT DOCUMENTS

| | | |
|---|---|---|
| DE | 102012205862 A1 | 10/2012 |
| DE | 102012205962 A1 | 11/2012 |
| DE | 102013204778 A1 | 9/2013 |
| DE | 102014212537 A1 | 12/2015 |
| DE | 102016201047 A1 | 8/2016 |
| JP | 2004338565 A | 12/2004 |
| JP | 2012106644 A | 6/2012 |
| JP | 2012111334 A | 6/2012 |
| JP | 2014019243 A | 2/2014 |
| JP | 2014213628 A | 11/2014 |
| JP | 2014227092 A | 12/2014 |
| JP | 2015160464 A | 9/2015 |
| KR | 20140023369 A1 | 2/2014 |
| WO | 2012150120 A1 | 11/2012 |
| WO | 2014048600 A1 | 4/2014 |
| WO | 2015106892 A1 | 7/2015 |
| WO | 2015139983 A1 | 9/2015 |

OTHER PUBLICATIONS

Notice of Grounds for Rejection for Korean Application No. 10-2018-7023273, dated Jul. 11, 2019, with translation, 16 pages.
German Search Report for German Application No. 10 2016 203 119.8, dated Feb. 8, 2017, with partial translation—12 pages.
International Search Report and Written Opinion for International Application No. PCT/EP2017/051171, dated Mar. 27, 2017—11 pages.
Chinese Office Action for Chinese Application No. 201780010250.5, dated Apr. 16, 2020 with translation, 17 pages.

* cited by examiner

ADD-ON MODULE FOR AN ELECTROHYDRAULIC BRAKE ASSEMBLY, AND BRAKE ASSEMBLY SYSTEM COMPRISING AN ADD-ON MODULE OF SAID TYPE

CROSS REFERENCE TO RELATED APPLICATIONS

This application is the U.S. National Phase Application of PCT/EP2017/051171, filed Jan. 20, 2017, which claims priority to German Patent Application No. 10 2016 203 119.8, filed Feb. 26, 2016, the contents of such applications being incorporated by reference herein.

FIELD OF THE INVENTION

The invention relates to an auxiliary module for an electrohydraulic brake assembly, in particular for use in highly automated driving, comprising a hydraulics unit with a pressure provision device for building up pressure in at least two brakes. The invention also relates to a brake assembly system.

BACKGROUND OF THE INVENTION

In motor vehicle engineering, "brake-by-wire" brake assemblies are being used ever more widely. Brake assemblies of this kind often have not only a master brake cylinder that can be actuated by the vehicle driver but also an electrically activatable pressure provision device (activatable "by-wire"), by means of which actuation of the wheel brakes takes place in the "brake-by-wire" operating mode.

In these modern brake systems, in particular electrohydraulic brake systems with the "brake-by-wire" operating mode, the driver does not have direct access to the brakes. When the pedal is actuated, a pedal decoupling unit and a simulator are usually actuated, and the braking demand of the driver is detected by a sensor system. The pedal simulator, which is commonly formed as master brake cylinder, is used to give the driver a brake pedal feel which is as familiar and comfortable as possible. The detected braking demand leads to the determination of a setpoint braking torque, from which the setpoint brake pressure for the brakes is then determined. The brake pressure is then built up actively in the brakes by a pressure provision device.

The actual braking is thus achieved by active pressure build-up in the brake circuits with the aid of a pressure provision device, which is activated by an open-loop and closed-loop control unit. By virtue of the brake pedal actuation being hydraulically decoupled from the pressure build-up, a large number of functionalities, such as ABS, ESC, TCS, slope starting assistance etc., can be implemented in a convenient manner for the driver in brake systems of this kind.

In brake systems of this kind, a hydraulic fall-back level is usually provided, by means of which the driver can brake or halt the vehicle by muscle power by actuating the brake pedal if the "by-wire" operating mode fails or is disrupted. Whereas, in the normal mode, the above-described hydraulic decoupling between brake pedal actuation and brake pressure build-up is realized by means of a pedal decoupling unit, this decoupling is eliminated in the fall-back level, thus enabling the driver to directly displace brake medium into the brake circuits. A switch is made to the fall-back level if it is no longer possible to build up pressure with the aid of the pressure provision device. This is the case inter alia if the check valve that connects the pressure provision device to the reservoir no longer reliably shuts off, such that a pressure build-up is no longer reliably possible.

The pressure provision device in the brake systems described above is also referred to as an actuator or hydraulic actuator. In particular, actuators are designed as linear actuators or linear units, in which, for the pressure build-up, a piston is displaced axially into a hydraulic pressure space which is constructed in series with a rotation-translation mechanism. The motor shaft of an electric motor is converted by the rotation-translation mechanism into an axial displacement of the piston.

DE 10 2013 204 778 A1, incorporated by reference herein, has disclosed a "brake-by-wire" brake assembly for motor vehicles which comprises a tandem master brake cylinder, which can be actuated by means of a brake pedal and the pressure spaces of which are in each case connected, separably by means of an electrically actuatable isolating valve, to a brake circuit with two wheel brakes, an activatable and deactivatable simulation device, which is hydraulically connected to the master brake cylinder, and an electrically controllable pressure provision device, which is formed by a piston-cylinder arrangement with a hydraulic pressure space, the piston of which is displaceable by an electromechanical actuator, wherein the pressure provision device is connected via two electrically actuatable activation valves to the inlet valves of the wheel brakes.

During normal operation, the driver is separated from the wheel brakes by switching of driver isolating valves, and the linear actuator is hydraulically connected to the wheel brakes by switching of actuator activation valves. A movement of the linear actuator out of its rest position in a forward direction effects a pressure build-up, and, in the reverse direction, a pressure dissipation, in the wheel brakes.

Such a brake-by-wire brake assembly is suitable for use in automated driving, in the case of which the vehicle control is partially or substantially entirely automated, such that the driver can perform other activities. In the event of a failure of the normal level of the brake assembly, it can take a relatively long time until the driver notices this failure and actuates the brake pedal himself or herself by muscle force.

For automated driving, a backup module is therefore required which, in the event of failure of the master brake system, can ensure basic brake functionality until the driver takes over. Exactly the time period between the failure occurring and the driver being ready to act is thus bridged in this way.

In this regard, there are already various proposed solutions. In the case of some of these technical solutions, provision is made for a dedicated brake fluid tank to be installed on the auxiliary module, which dedicated brake fluid tank is connected to the tank of the primary brake assembly via a hose line.

Such an arrangement however has numerous disadvantages. Firstly, it has an insecure hose connection between the two brake fluid tanks, which can easily be damaged and lead to leakages. For the monitoring, a further tank warning device is necessary. The packaging of an auxiliary module of said type has furthermore proven to be unfavorable and difficult.

SUMMARY OF THE INVENTION

An aspect of the invention is therefore based on providing an auxiliary module in the case of which it is sought to avoid the described disadvantages. In particular, it is sought to permit increased safety and reliability and permit good packaging. It is furthermore sought to provide a corresponding brake assembly system.

With regard to the auxiliary module, this is achieved according to an aspect of the invention in that at least one reservoir for brake fluid is integrated into the hydraulic unit.

The subclaims relate to advantageous refinements of the invention.

An aspect of the invention is based on the consideration that the auxiliary module performs a highly safety-relevant function, because it must be active exactly in the critical time period in which the brake assembly is non-functional but the driver has not yet taken over full control of the brakes. In particular in highly automated driving, in the case of which the driver relies on the functioning of the system involved and turns his or her attention to other activities, it can take a relatively long time until the driver is ready to act and obtains full control of the brake pedal.

It must therefore be ensured that the module, when it is used, is fully ready for operation and functional. This means in particular that it should reliably continue or initiate a braking process and must accordingly build up brake pressure. The availability of brake fluid should therefore be ensured.

As has now been identified, these stringent requirements can be met by virtue of the required brake fluid being held in the hydraulic unit of the auxiliary module, or the corresponding reservoir being integrated into said hydraulic unit. In this way, it is possible to avoid insufficient pressure medium being available when required owing to a leaking or destroyed hydraulic line to a brake fluid reservoir tank of the brake assembly.

The statement that the respective reservoir is integrated into the hydraulic unit means in particular that the reservoir is arranged in the same housing as the hydraulic components such as for example valves and pressure sensors, and does not constitute an external part. In particular, the hydraulic lines between reservoir and respective pump are also arranged in said housing.

The pressure provision device advantageously comprises at least one pump which is driven by means of an electric motor and the suction side of which is hydraulically connected to the respective reservoir.

In a preferred embodiment, two reservoirs for brake fluid and exactly two pumps are provided, wherein each of the two pumps is, at the suction side, hydraulically connected via a suction line to exactly one reservoir. It is preferable for each case one reservoir to provide the brake fluid for one brake.

It is preferable for the two pumps to be driven by a common electric motor, which drives both pumps simultaneously. By opening inlet valves assigned to the wheel brake, each of the pumps can be individually triggered in targeted fashion to convey brake fluid.

Each pump is advantageously connected at the pressure side to a wheel brake feed line which is designed for connection to a hydraulic wheel brake. In this way, the pump can convey brake fluid into the hydraulic wheel brake, whereby brake pressure is built up.

The respective wheel brake feed line is advantageously connected to a pressure sensor which measures the pressure in the wheel brake feed line, such that pressure control can also be performed in the auxiliary module.

It is advantageous for a valve which is closed when electrically deenergized to be connected into the respective suction line for the purposes of controlling the pump.

It is preferable for a hydraulic return line to branch off from the respective wheel brake feed line, which hydraulic return line is hydraulically connected to in each case one reservoir. In this way, brake fluid can be discharged from the corresponding wheel brake in a targeted manner. This permits the setting of different brake pressures in the wheel brakes that are hydraulically connected to the auxiliary module.

A return valve which is closed when electrically deenergized is advantageously connected into the respective return line. The return valve is preferably switched into its isolating position during the pressure build-up and, when required, switched into its pass-through position in order to dissipate pressure in the respective wheel brake.

The auxiliary module is advantageously configured such that the respective pump draws medium in from the reservoir from the bottom. This prevents any residual air that possibly still remains from being drawn in from the reservoir. For this purpose, it is advantageous for a pipe to be arranged in the reservoir, through which pipe the pump draws in the brake fluid.

The additional module preferably comprises a housing for the hydraulics unit, a motor housing and an electronics housing. The housing for the hydraulics unit is in particular a valve block, in particular an aluminum valve block.

The housing for the hydraulics unit is preferably arranged between electronics housing and motor housing. In this way, a particularly compact design is realized, which permits a space-saving installation into the vehicle. This results in packaging which is convenient to handle.

The respective reservoir is preferably connected to a hydraulic equalization line which is provided for forming a connection to the atmosphere.

With regard to the brake assembly system, the above-stated object is achieved according to an aspect of the invention by means of a brake assembly, comprising hydraulically actuatable wheel brakes, at least one electrically actuatable wheel valve for each wheel brake, for the purposes of setting wheel-specific brake pressures; a pressure medium reservoir tank which is at atmospheric pressure; a master brake cylinder which is connected and/or connectable to the wheel brakes, and an electrically controllable pressure provision device for the actuation of the wheel brakes, having a pressure space, wherein the respective wheel brake is hydraulically connected to the pressure space by a wheel brake line, furthermore comprising an auxiliary module as described above.

The equalization line is preferably connected to the pressure medium reservoir tank of the brake assembly.

The pressure provision device is advantageously formed by a cylinder-piston arrangement with a hydraulic pressure space, the pressure piston of which is displaceable by an electric motor and, connected downstream thereof, a rotation-translation mechanism, wherein the pressure space is connected to the pressure medium reservoir tank via a hydraulic replenishment line for the replenishment of pressure medium.

The auxiliary module is connectable to an externally activatable brake assembly with a pressure provision device which can actively generate pressure in the wheel brakes. The brake assembly is for example, in an advantageous embodiment, an ESC brake assembly.

The equalization line is advantageously formed at least partially as a steel line. The equalization line is preferably connected directly to the pressure medium reservoir tank, which for this purpose preferably has a separate port. Advantageous packaging is realized in this way. In an alternative refinement, the equalization line is led at least partially, in particular substantially entirely, through the brake assembly or through the housing of the brake assembly.

In a preferred embodiment, a first wheel brake line of the brake assembly opens into a first wheel brake feed line of the auxiliary module, wherein a second wheel brake line of the brake assembly opens into a second wheel brake feed line of the auxiliary module, and wherein an isolating valve which is open when electrically deenergized is connected into the respective wheel brake feed line.

The two wheel brake feed lines are preferably connected to front-wheel brakes.

The brake assembly advantageously has a simulator into which the driver conveys brake fluid in a brake-by-wire normal operating mode, wherein the braking demand of the driver is determined. Owing to the braking demand of the driver, the open-loop and closed-loop control unit of the brake assembly then activates the pressure provision device, which builds up a corresponding pressure in the wheel brakes.

The advantages of aspects of the invention lie in particular in the fact that, through the provision of the brake fluid in the auxiliary module, the availability and reliability of a brake assembly equipped with an auxiliary module are considerably increased. The packaging and the installation are made possible in a convenient manner. Such a construction permits manufacturing on manufacturing lines of conventional brake assemblies.

BRIEF DESCRIPTION OF THE DRAWINGS

An exemplary embodiment of an aspect of the invention will be discussed in more detail on the basis of a drawing. In the drawing, in a highly schematic illustration.

In all of the figures, identical parts are denoted by the same reference designations.

DETAILED DESCRIPTION OF THE PREFERRED EMBODIMENTS

Figure 1:
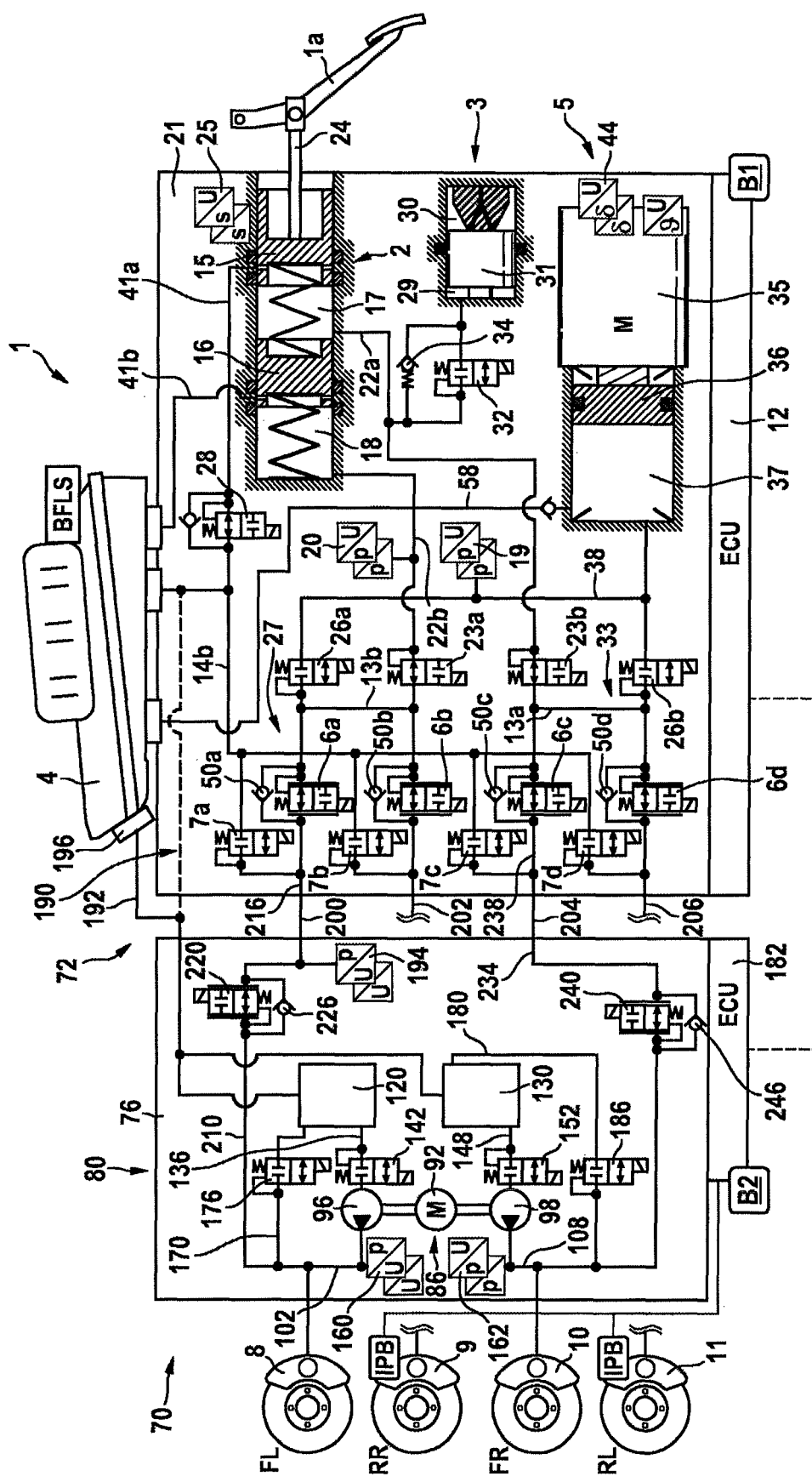
FIG. 1 shows a hydraulic circuit diagram of a brake assembly system having a brake assembly and having an auxiliary module in a preferred embodiment.

FIG. 1 illustrates a preferred exemplary embodiment of a brake assembly 1 according to an aspect of the invention. The brake assembly 1 comprises a master brake cylinder 2, which is actuatable by means of an actuating or brake pedal 1a, a simulation device 3 which interacts with the brake master cylinder 2, a pressure medium reservoir tank 4 which is assigned to the master brake cylinder 2 and which is at atmospheric pressure, an electrically controllable pressure provision device 5, which is formed by a cylinder-piston arrangement with a hydraulic pressure space 37, the piston 36 of which is displaceable by an electromechanical actuator comprising an electric motor and a rotation/translation mechanism, an electrically controllable pressure modulation device for setting wheel-specific brake pressures, and an electronic open-loop and closed-loop control unit 12.

In the example, the pressure modulation device (not designated specifically) comprises, for each hydraulically actuable wheel brake 8, 9, 10, 11 and for each actuatable wheel brake 8, 9, 10, 11 of a motor vehicle (not illustrated), an inlet valve 6a-6d and an outlet valve 7a-7d, which are hydraulically interconnected in pairs by central ports and are connected to the wheel brakes 8, 9, 10, 11. The inlet ports of the inlet valves 6a-6d are supplied, via brake circuit supply lines 13a, 13b, with pressures which, in a "brake-by-wire" operating mode, are derived from a system pressure present in a system pressure line 38 which is connected to the pressure space 37 of the pressure provision device 5. Here, the brakes 8, 9 are hydraulically connected to a first brake circuit 27, and the brakes 10, 11 are hydraulically connected to a second brake circuit 33.

A check valve 50a-50d which opens in the direction of the brake circuit supply lines 13a, 13b is connected in parallel with each of the inlet valves 6a-6d. In a fall-back operating mode, the brake circuit supply lines 13a, 13b are supplied, via hydraulic lines 22a, 22b, with the pressures of the pressure spaces 17, 18 of the master brake cylinder 2. The outlet ports of the outlet valves 7a-7d are connected to the pressure medium reservoir tank 4 via a return line 14b.

The master brake cylinder 2 has, in a housing 21, two pistons 15, 16 which are arranged in series and which delimit the hydraulic pressure spaces 17, 18. On the one hand, the pressure spaces 17, 18 are connected to the pressure medium reservoir tank 4 via radial bores formed in the pistons 15, 16 and corresponding pressure equalization lines 41a, 41b, wherein the connections can be shut off by a relative movement of the pistons 15, 16 in the housing 21. On the other hand, the pressure spaces 17, 18 are connected to the abovementioned brake circuit supply lines 13a, 13b by means of the hydraulic lines 22a, 22b.

A valve 28 which is open when electrically deenergized is contained in the pressure equalization line 41a. The pressure spaces 17, 18 contain restoring springs (not designated specifically), which position the pistons 15, 16 in an initial position when the master brake cylinder 2 is not actuated. A piston rod 24 couples the pivoting movement of the brake pedal 1a resulting from a pedal actuation to the translational movement of the first master brake cylinder piston 15, the actuation travel of which is detected by a travel sensor 25, which is preferably of redundant design. In this way, the corresponding piston travel signal is a measure of the brake pedal actuation angle. It represents a braking demand of the vehicle driver.

Arranged in the line sections 22a, 22b connected to the pressure spaces 17, 18 is a respective isolating valve 23a, 23*b*, which is designed as an electrically actuable 2/2-way valve which is preferably open when electrically deenergized. By means of the isolating valves 23*a*, 23*b*, the hydraulic connection between the pressure spaces 17, 18 of the master brake cylinder and the brake circuit supply lines 13*a*, 13*b* can be shut off. A pressure sensor 20 connected to the line section 22*b* detects the pressure built up in the pressure space 18 as a result of a displacement of the second piston 16.

The simulation device 3 is hydraulically couplable to the master brake cylinder 2 and, in the example, is composed substantially of a simulator chamber 29, a simulator spring chamber 30 and a simulator piston 31 which separates the two chambers 29, 30 from one another. The simulator piston 31 is supported on the housing 21 by an elastic element (for example a spring), which is arranged in the simulator spring chamber 30 and which is advantageously preloaded. The simulator chamber 29 is connectable to the first pressure space 17 of the master brake cylinder 2 by means of an electrically actuatable simulator valve 32. When a pedal force is input and simulator valve 32 is open, pressure medium flows from the master brake cylinder pressure space 17 into the simulator chamber 29. A check valve 34 arranged hydraulically antiparallel with respect to the simulator valve 32 allows the pressure medium to flow back from the simulator chamber 29 to the master brake cylinder pressure space 17 largely unhindered, irrespective of the switching state of the simulator valve 32. Other embodiments and connections of the simulation device to the master brake cylinder 2 are conceivable.

The electrically controllable pressure provision device 5 is designed as a hydraulic cylinder-piston arrangement or a single-circuit electrohydraulic actuator, whose pressure piston 36, which delimits the pressure space 37, is actuatable by a schematically indicated electric motor 35 via a likewise schematically illustrated rotation/translation mechanism. A merely schematically indicated rotor position sensor which serves to detect the rotor position of the electric motor 35 is denoted by the reference designation 44. Use may additionally also be made of a temperature sensor for sensing the temperature of the motor winding.

The actuator pressure generated by the effect of the force of the piston 36 on the pressure medium enclosed in the pressure space 37 is fed into the system pressure line 38 and detected by means of a pressure sensor 19, which is preferably of redundant design. When the activation valves 26*a*, 26*b* are open, the pressure medium enters the wheel brakes 8, 9, 10, 11 for the actuation thereof. Thus, when the activation valves 26*a*, 26*b* are open, during a normal braking operation in the "brake-by-wire" operating mode, a wheel brake pressure build-up and dissipation for all the wheel brakes 8, 9, 10, 11 takes place by means of forward and backward displacement of the piston 36. During the pressure dissipation, the pressure medium that has previously been displaced out of the pressure space 37 into the wheel brakes 8, 9, 10, 11 flows back into the pressure space 37 over the same route. By contrast, during a braking operation with wheel brake pressures which differ between individual wheels and which are controlled with the aid of the inlet and outlet valves 6*a*-6*d*, 7*a*-7*d* (e.g. during an antilock control operation (ABS control)), the pressure medium component discharged via the outlet valves 7*a*-7*d* flows into the pressure medium reservoir tank 4 and is thus initially no longer available to the pressure provision device 5 for the actuation of the wheel brakes 8, 9, 10, 11. Additional pressure medium can be drawn into the pressure space 37, through a replenishment line 58, by means of a retraction of the piston 36 while the activation valves 26*a*, 26*b* are closed.

The brake assembly 1 is hydraulically connected to an auxiliary module 70 which can perform braking actions in the event of failure of the pressure build-up capability of the brake assembly 1. In this way, the time period until the driver can take over the braking of the vehicle can be bridged. The brake assembly 1 and auxiliary module 70 form a system or brake assembly system 72.

The auxiliary module 70 has a hydraulics unit 80 arranged in a housing or hydraulics housing 76. A pressure provision device 86 comprises an electric motor 92 by means of which, if required, two pumps 96, 98 can be operated. The pump 96 is connected at the pressure side via a hydraulic line or wheel brake feed line 102 to the wheel brake 8. The pump 98 is connected at the pressure side via a line or wheel brake feed line 108 to the wheel brake 10.

The auxiliary module 70 is designed to be able to reliably take over the braking function when required. For this purpose, two reservoirs 120, 130 for brake fluid are provided, which are integrated in the hydraulics unit 80 and which are arranged in the hydraulics housing 76. The brake fluid reservoir 120 is hydraulically connected to the suction side of the pump 96 via a hydraulic line 136, into which there is connected a reservoir valve 142 which is closed when electrically deenergized. The reservoir 130 is hydraulically connected, at the suction side, to the pump 98 via a hydraulic line 148, into which there is connected a reservoir valve 152 which is closed when electrically deenergized. A pressure sensor 160 which is preferably of redundant design measures the pressure in the line 102. A pressure sensor 162 of preferably redundant design measures the pressure in the line 108. An open-loop and closed-loop control unit 182 is connected at the signal input side to the pressure sensors 160, 162.

From the line 102, there branches off a hydraulic return line 170 which hydraulically connects line 102 to the reservoir 120, wherein a return valve 176 which is closed when electrically deenergized is connected into the return line. From the line 108, there branches off a hydraulic return line 180, into which a return valve 186 which is closed when electrically deenergized is connected.

Below, the hydraulic connection of the auxiliary module 70 to the brake assembly 1 will be described. A common hydraulic equalization line 190, which is illustrated by dashed lines in FIG. 1 and which is led partially through the housing 21 of the brake assembly 1, connects the two reservoirs 120, 130 to the brake medium reservoir tank 4. In a preferred variant, an equalization line 192, which is led outside the housing 21, is connected to the brake medium reservoir tank 4 at a separate brake medium tank port 196 situated outside the housing 21. The equalization line 190, 192 is preferably formed at least partially as a steel line.

The wheel brake 9, which in the present case corresponds to the right-hand rear-wheel brake, is connected to the pressure provision device via a brake line 202. The wheel brake 11, which corresponds to the left-hand rear-wheel brake, is connected via a brake line 206 to the pressure provision device 5. The wheel brake 8, which corresponds to the left-hand front-wheel brake, is connected by means of a brake line 200 to the pressure provision device 5. The wheel brake 10, which corresponds to the right-hand front-wheel brake, is connected via a brake line 204 to the pressure provision device.

The auxiliary module 70 is connected hydraulically into the brake lines 200, 204 such that a section of said brake lines, which is also referred to here as wheel brake feed line 102, 108, runs in the auxiliary module 70. In this way, the auxiliary module can build up brake pressure in the brakes 8, 10 as required. The brake line 200 runs, in a line section 210, within the auxiliary module 70. Here, the line section 210 connects a section 216, which runs within the brake assembly 1, to the hydraulic line 102. An isolating valve 220 which is open when electrically deenergized is connected into the line section 210, in parallel with which isolating valve there is connected a check valve 226 which, when the isolating valve 220 is shut off, prevents the return flow of brake fluid out of the wheel brake 8. A pressure sensor 194 measures the pressure in the brake line 200. The signal of the pressure sensor serves preferably for detecting the driver braking demand in a fall-back level, in which the brake pressure setting is performed by the auxiliary module.

The brake line 204 runs, in a line section 234, within the auxiliary module 70. Here, the line section 234 hydraulically connects a section 238, which runs within the brake assembly 1, to the hydraulic line 108. An isolating valve 240 which is open when electrically deenergized is connected into the line section 234, in parallel with which isolating valve there is connected a check valve 246 which, when the isolating valve 240 is shut off, prevents the return flow of brake fluid out of the wheel brake 10.

If the brake assembly 1 exhibits a malfunction or fails entirely, such that it cannot set the demanded brake pressure in the wheel brakes 8-11, the auxiliary module 70 can build up pressure in the two front-wheel brakes 8, 10. For this purpose, the two isolating valves 220, 240 are switched into their isolating position, such that the wheel brakes 8, 10 are hydraulically isolated from the pressure provision device 5 and from the master brake cylinder 2. The open-loop and closed-loop control unit 182 activates the electric motor 92, which activates the pumps 96, 98. The respective pump 96, 98 then draws in brake fluid from the respective reservoir 120, 130 and conveys said brake fluid through the corresponding wheel brake feed line 102, 108 into the wheel brake 8, 10. During the pressure build-up, the return valves 176, 186 are switched into their isolating position for as long as the same brake pressure is to be built up in both wheel brakes 8, 10. For a build-up of different pressures, one or both return valves 176, 186 is/are, if required, opened and function(s) as outlet valve(s), through which brake fluid can flow into the respective reservoir 120, 130.

The auxiliary module 70 preferably remains active when the driver, in a hydraulic fall-back level, builds up brake force by muscle force by actuating the brake pedal 1a, and it thus remains possible for a brake force boosting function to be provided. It is also thus possible (at least for the front axle) to realize an ABS function and, through targeted pressure reduction, also an EBD function for the rear axle. In the fall-back level, at the rear axle, an EPB (electronic parking brake) is preferably activated by the auxiliary module 70. This activation is withdrawn when the driver performs a braking input, in order to avoid overbraking (locking up) of the rear axle.

Figure 2:
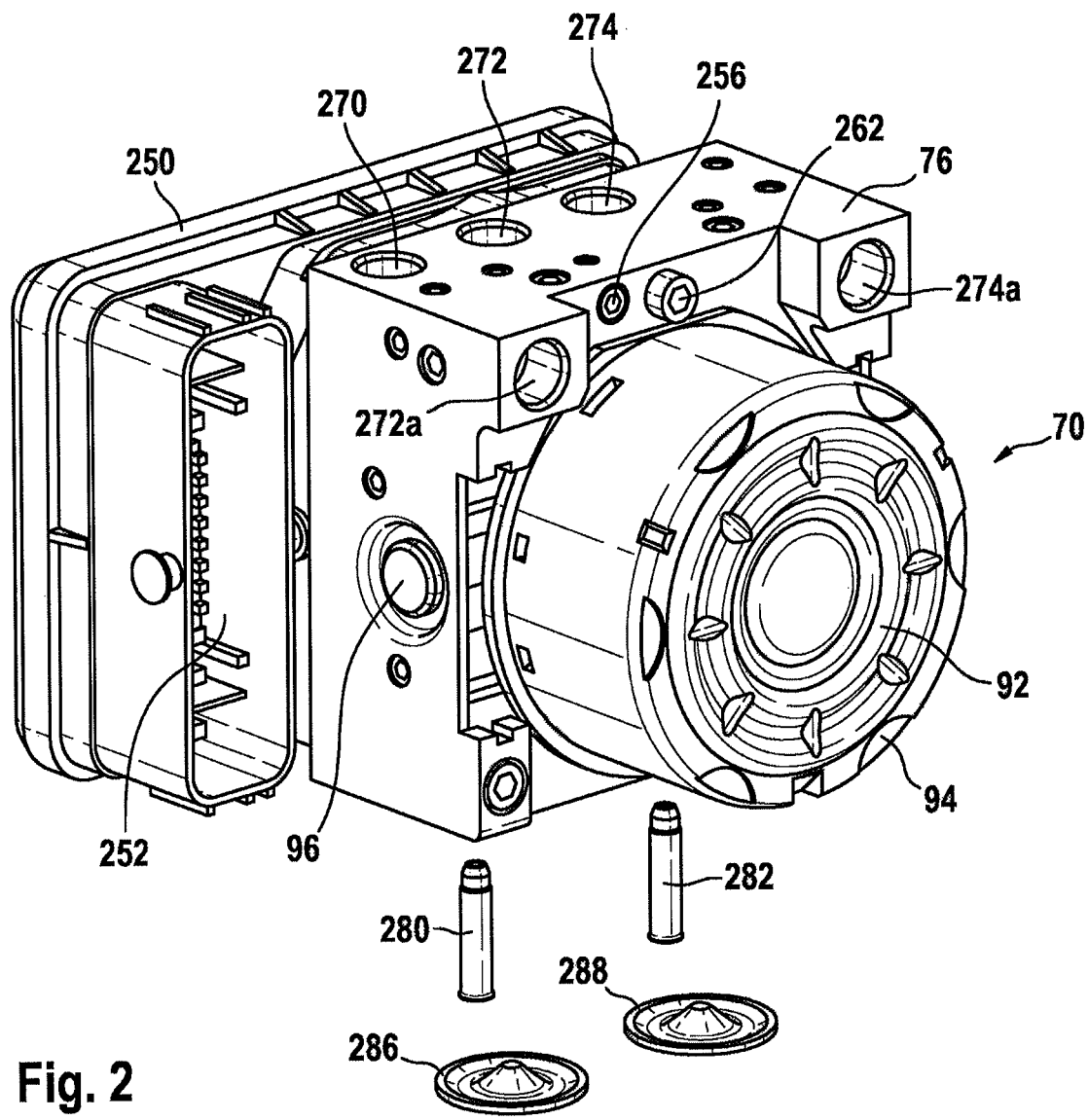
FIG. 2 shows the auxiliary module as per FIG. 1, having an electronics housing, having a hydraulics housing for the hydraulics unit and having a motor housing, in the assembled state in a preferred embodiment in a perspective illustration.

FIG. 2 is a perspective illustration of the auxiliary module 70 as per FIG. 1. The hydraulics housing 76 of the hydraulics unit 80 is, in effect, sandwiched between the motor 92, which is arranged in a motor housing 94, and an electronics housing 250, in which the open-loop and closed-loop control unit 182 is arranged and which has an electrical connector plug 252. In other words, the motor 92 is arranged on the opposite side of the housing 76 in relation to the electronics housing 250. One of the two pumps 96 is visible on the left-hand side of the housing 76 in the figure, and the other pump 98 is arranged on the opposite side. A valve receptacle 256 is also illustrated. A port 270 serves for the connection of the auxiliary module to a brake medium reservoir tank of a brake assembly, in particular to the brake medium reservoir tank 4 of the brake assembly 1. Also visible are hydraulic outlets 272, 274 to wheel brakes (wheel brakes 8, 10 in FIG. 1) and a fastening bolt 262 for the ECU. For the connection to the brake assembly 1 (for example to the sections 216 and 238 in FIG. 1), hydraulic inlets 272a, 274a are provided.

Also visible in FIG. 2 are two pipes 280, 282 and two closure covers 286, 288. The pipe 280 is arranged in the reservoir 120 which is closed off by the closure cover 286. The pipe 282 is arranged in the reservoir 148 which is closed off by the closure cover 288.

Figure 3:
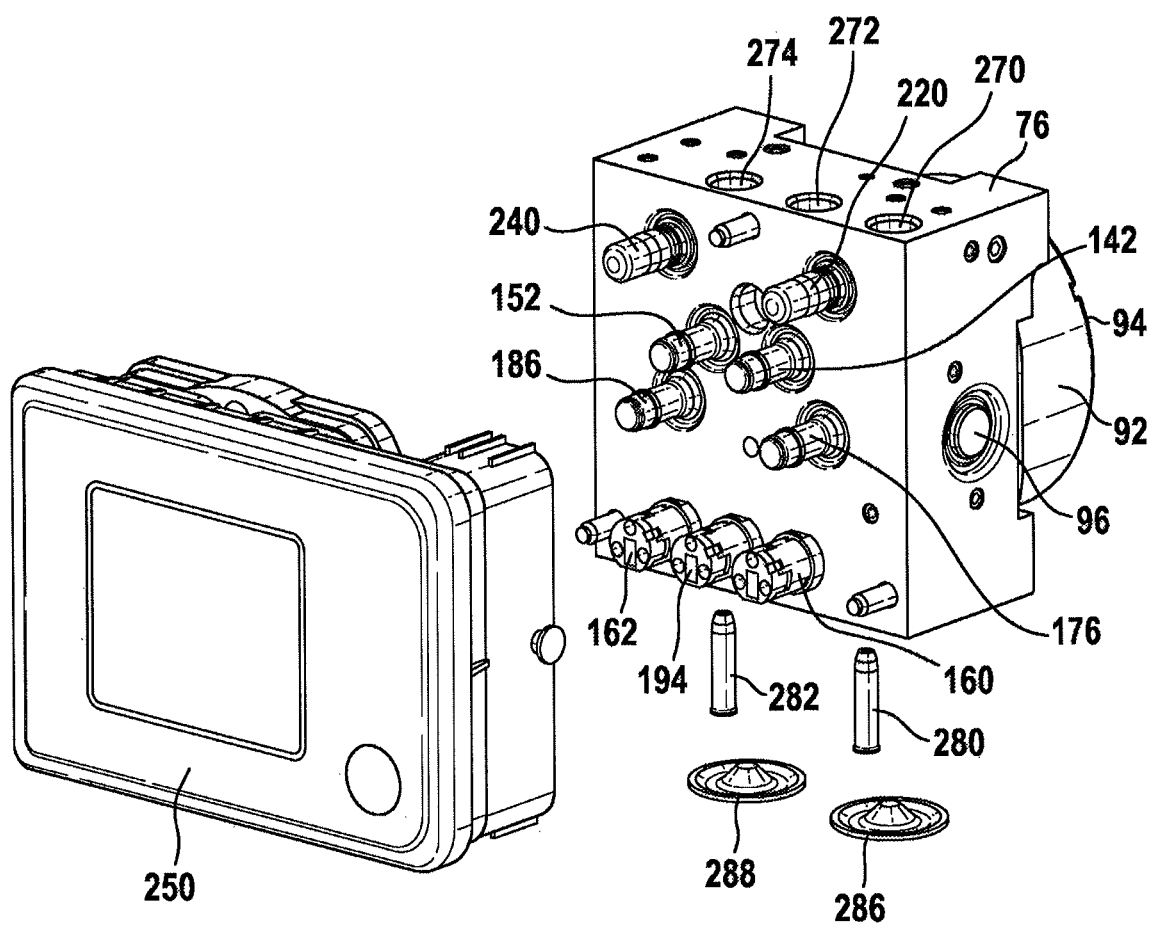
FIG. 3 shows the auxiliary module as per FIG. 2 in a further perspective illustration, with the electronics housing having been removed.

FIG. 3 shows that side of the housing 76 which faces toward the electronics housing 250. The isolating valves 220, 240, which are open when electrically deenergized, are arranged in a first row. Below this, there is arranged a two-row group of four of the valves 142, 152, 176, 186 which are closed when electrically deenergized, wherein, in each case, the two reservoir valves 142, 152 are arranged in one row, and the two return valves 178, 186 are arranged in a row of two. Also visible are the three pressure sensors 160, 162, 194, which are arranged in one row.

Figure 4:
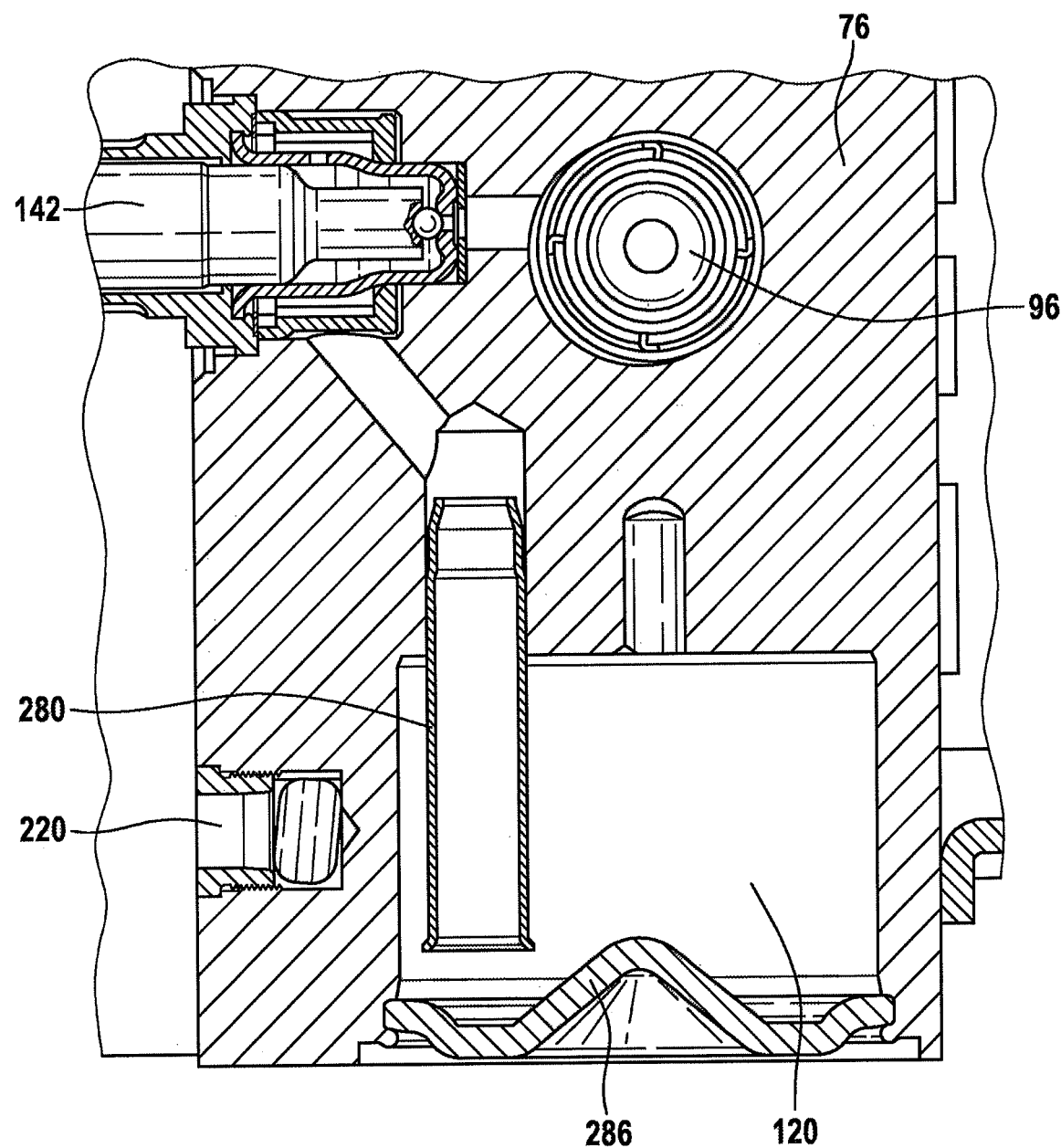
FIG. 4 shows a section, from a side elevation, through the auxiliary module as per FIG. 2.

FIG. 4 shows a section, from a side elevation, through the reservoir 120 closed off by means of the closure cover 286, and through the pipe 280 which is arranged in the reservoir 120 and which prevents the pump 96 from drawing in air.

Figure 5:
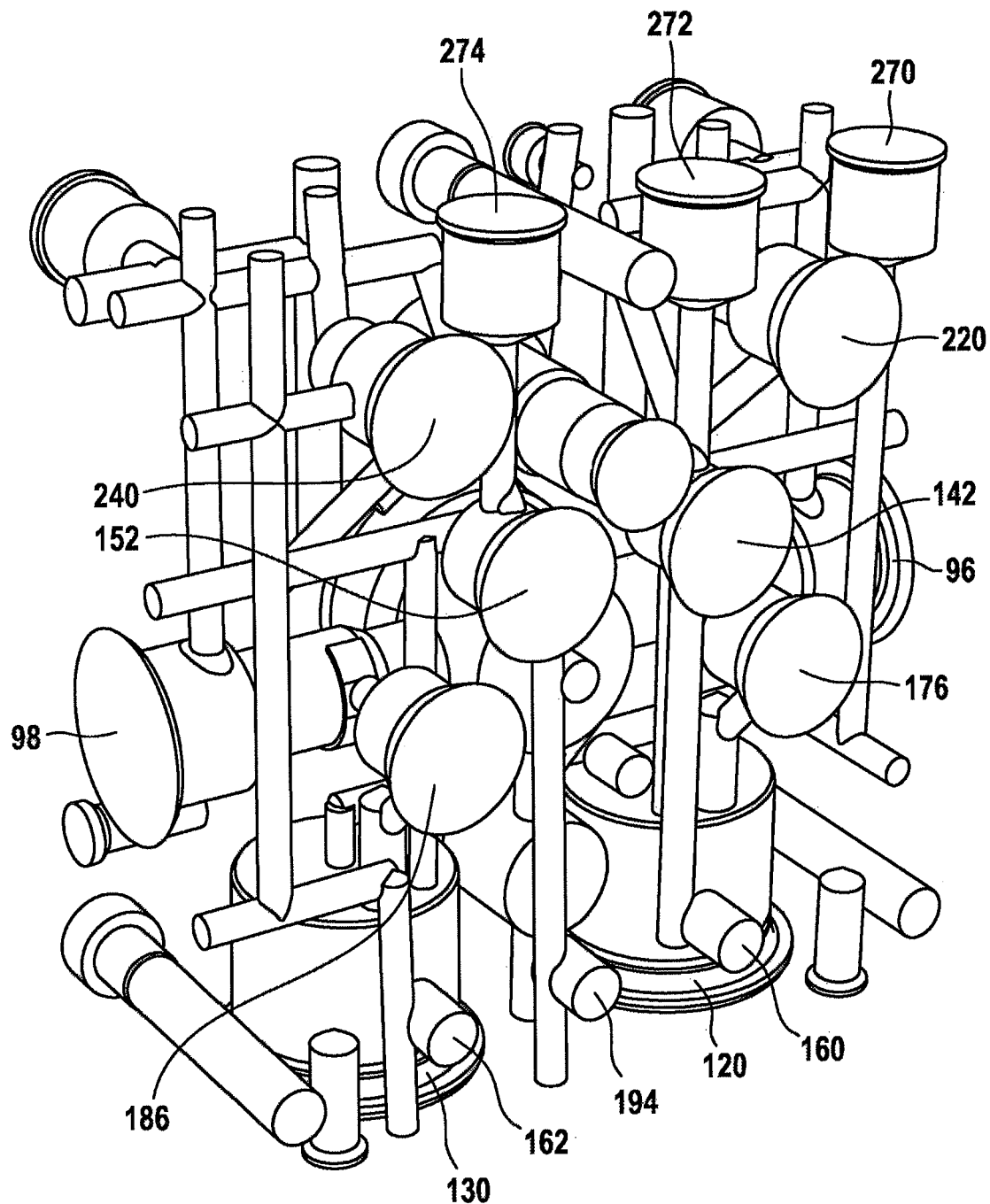
FIG. 5 is a perspective illustration of the auxiliary module as per FIG. 2, with the housing omitted.

FIG. 5 is an illustration of the components arranged in the housing 76, wherein the housing is not visible in this illustration. As a result, the valve and sensor positions of the auxiliary module 70 can be clearly seen.

Figure 6:
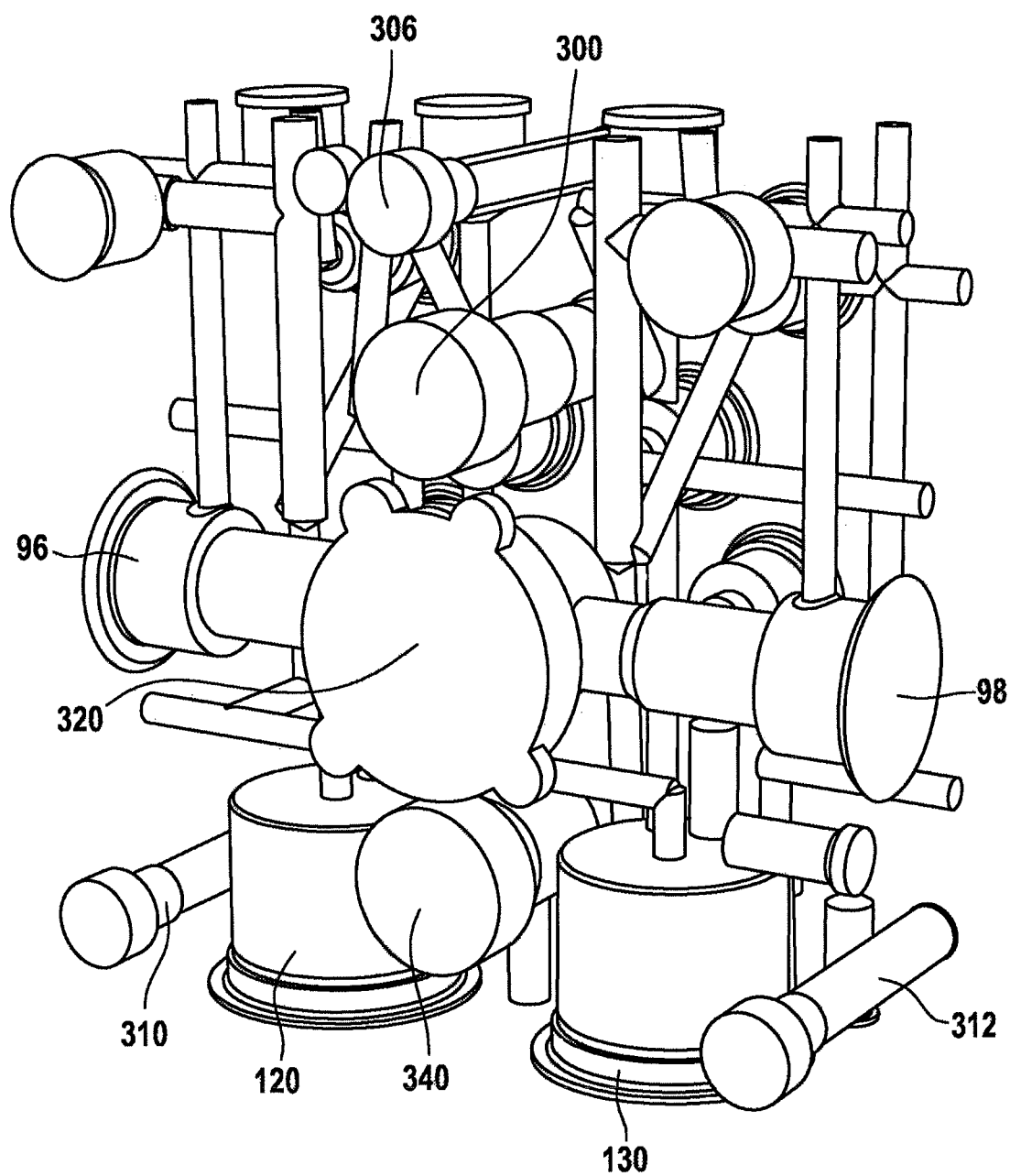
FIG. 6 is a further perspective illustration of the auxiliary module, with the housing omitted.

FIG. 6 shows a view, from the motor side, of the auxiliary module 70, with the housing 76 not being visible. In said figure, it is possible to see a bore 300 for a motor plug which serves for the electrical connection of the motor 90 to the open-loop and closed-loop control unit 182 or ECU. Bores 306, 310, 312 receive fastening bolts for fastening bolts of the ECU. A motor bore 320 contains the A bearing of the motor 90 or the eccentric shaft end of the motor and thus forms an eccentric bearing. Also visible in the figure is a reservoir 340 for leakage fluid from the pumps 96, 98.

Figure 7:
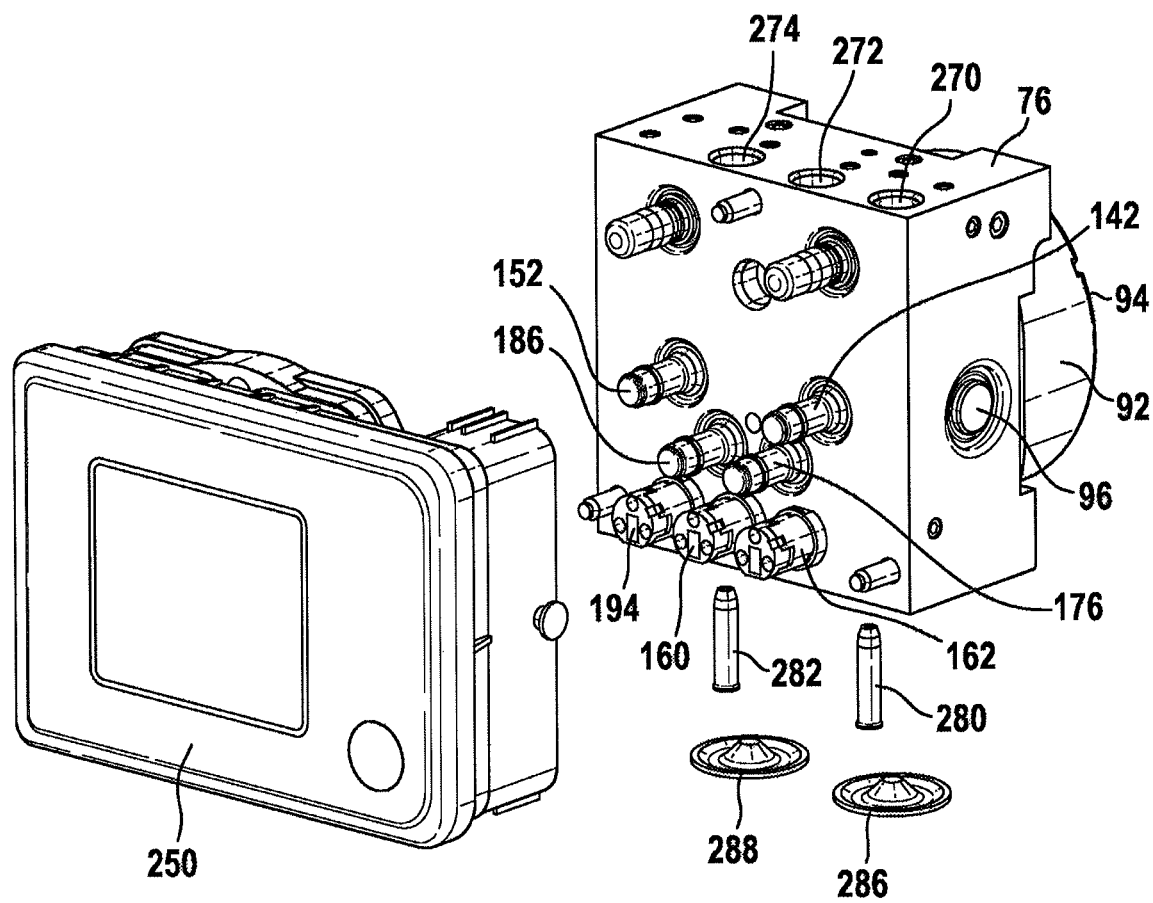
FIG. 7 shows the auxiliary module as per FIG. 1, having an electronics housing, having a hydraulics housing for the hydraulics unit and having a motor housing, in the assembled state in a further preferred embodiment in a perspective illustration.
Figure 8:
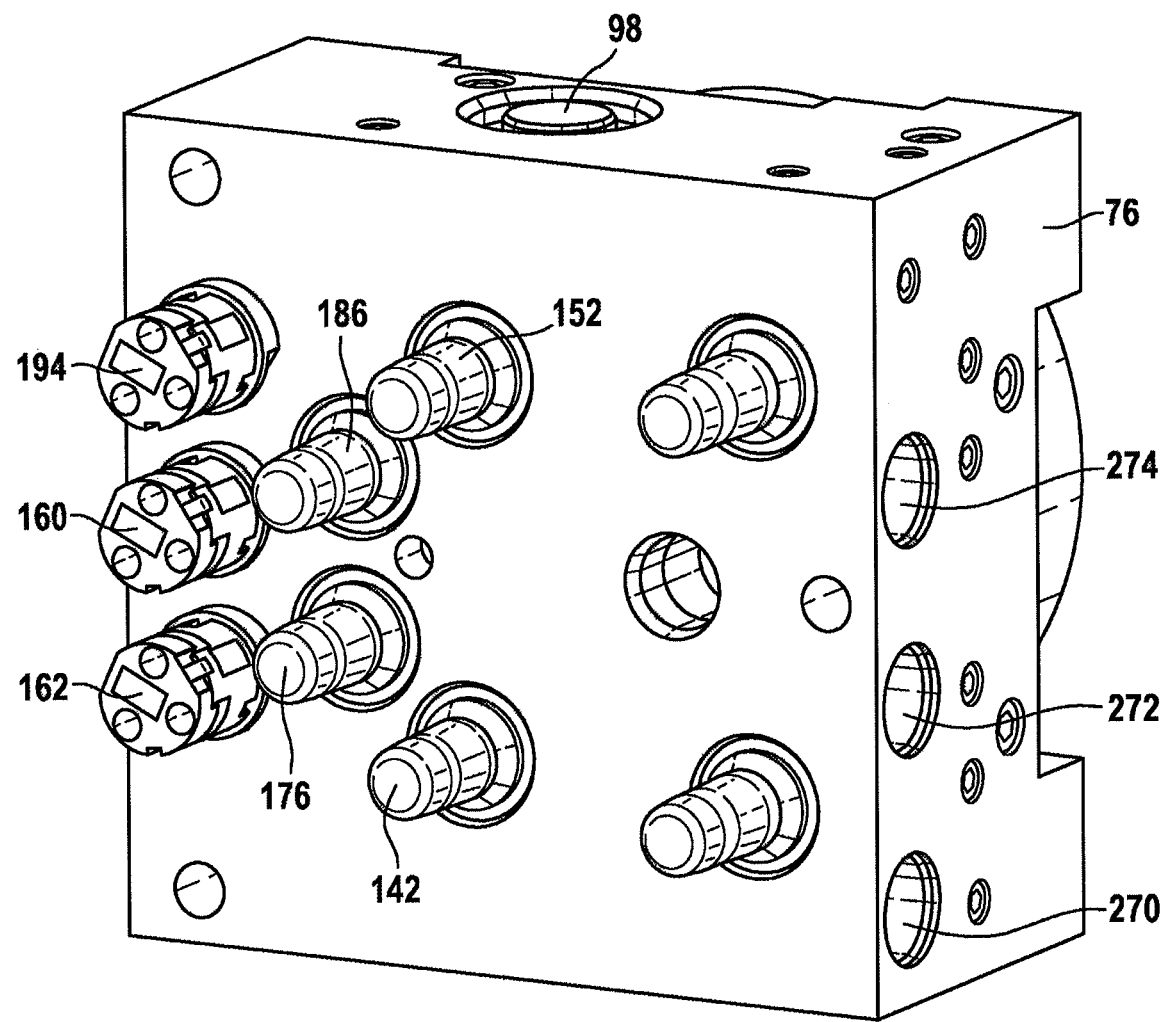
FIG. 8 shows the hydraulics housing of the auxiliary module as per FIG. 7 in a perspective illustration.
Figure 9:
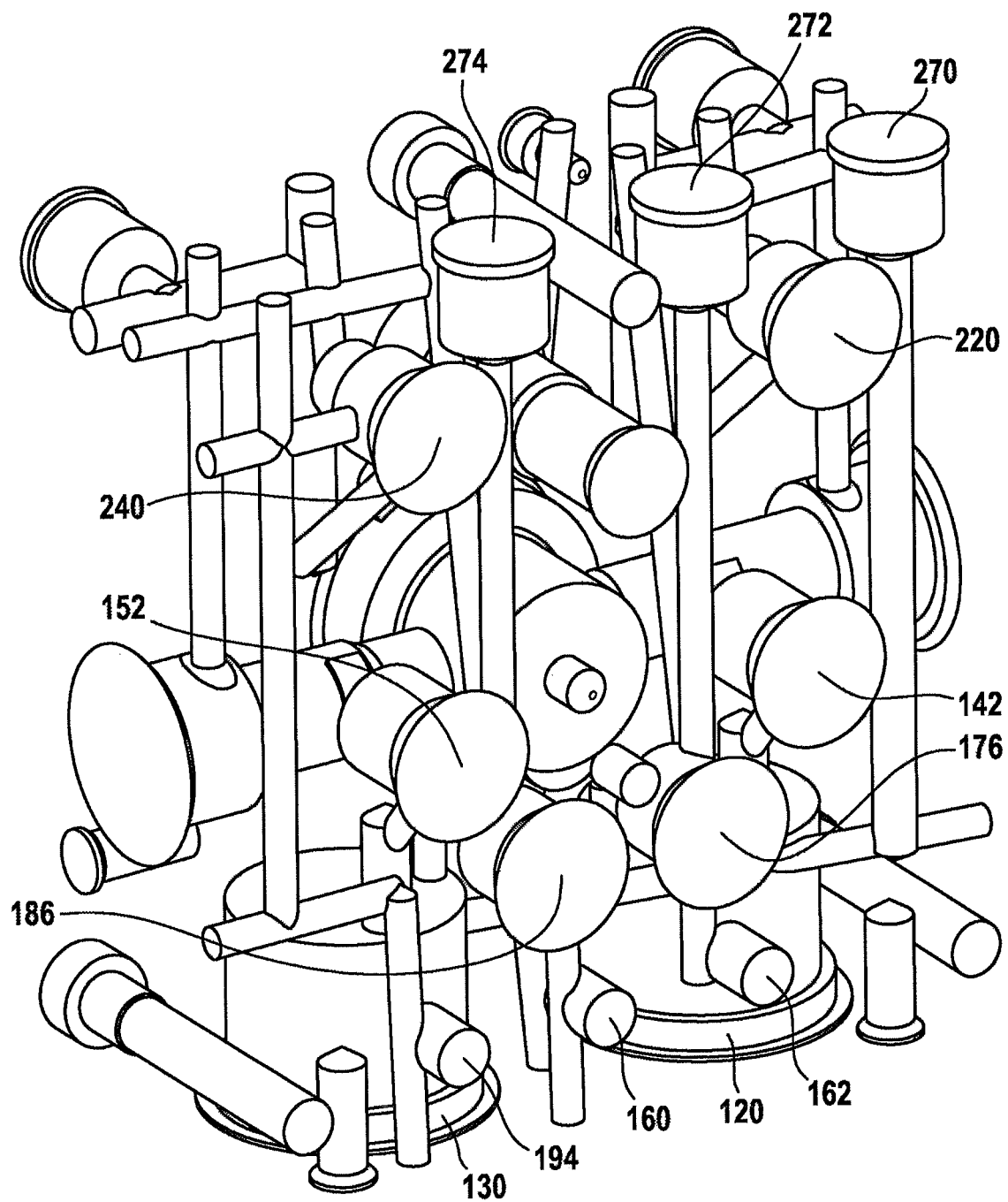
FIG. 9 is a perspective illustration of the auxiliary module as per FIG. 7, with the housing omitted.
Figure 10:
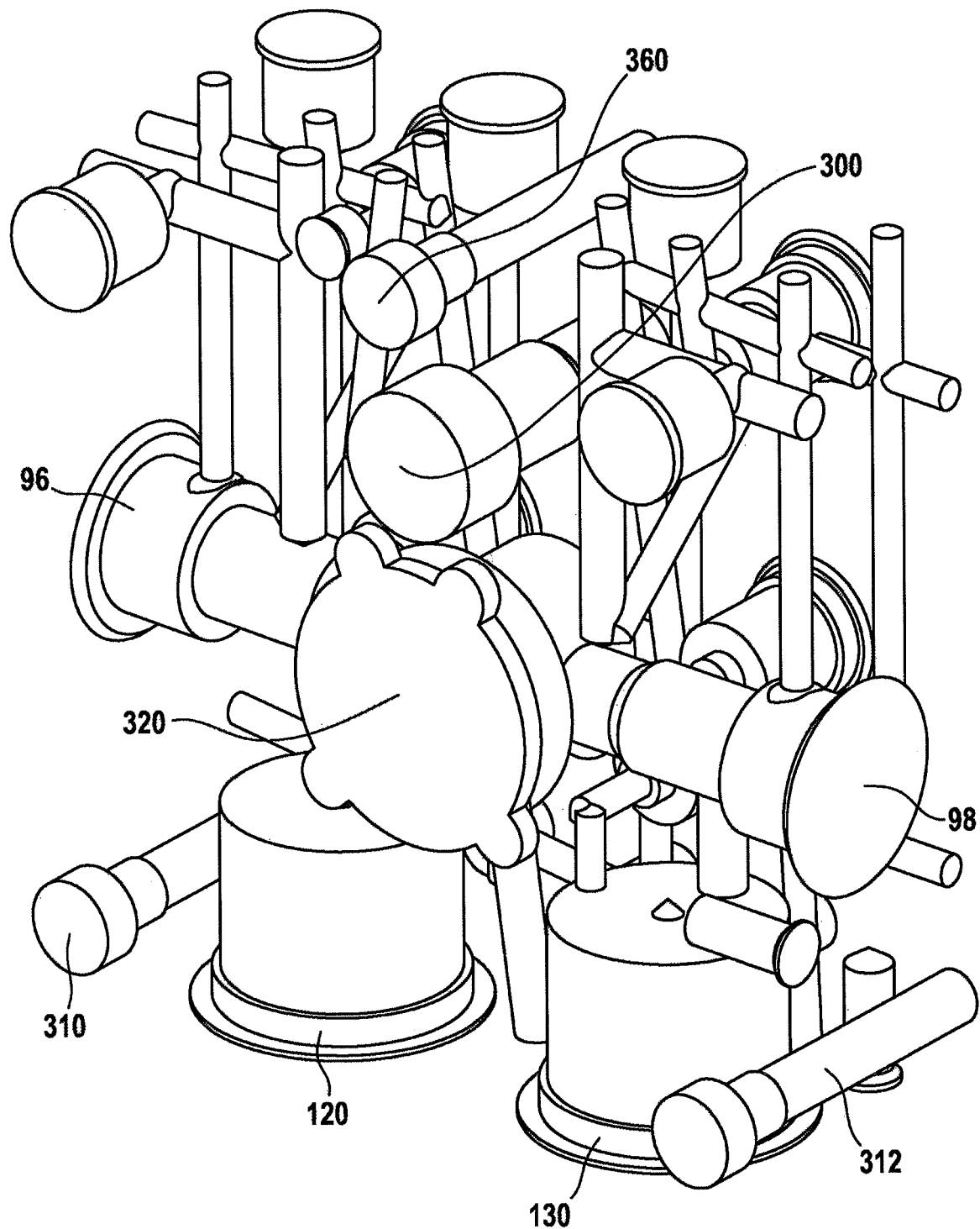
FIG. 10 is a further perspective illustration of the auxiliary module, with the housing omitted.

An auxiliary module 70 in a further preferred embodiment is illustrated in FIG. 7. This differs from the embodiment of the auxiliary module 70 illustrated in FIG. 3 by the arrangement of the valves 152, 142, 186, 176, which have now been relocated closer to the pressure sensors 194, 160, 162. FIGS. 8, 9 and 10 show this embodiment of the auxiliary module again in further perspective illustrations.

The invention claimed is:
1. An auxiliary module for an electrohydraulic brake assembly, for use in highly automated driving, comprising:
a hydraulics unit comprising a hydraulics housing with a pressure provision device provided at least partially within the hydraulics housing for building up pressure in at least two brakes,
at least one reservoir for brake fluid within the hydraulics housing of the hydraulics unit,
a first wheel brake feed line configured to be connected to a first wheel brake line of the brake assembly,
a second wheel brake feed line configured to be connected to a second wheel brake line of the brake assembly, and
an isolating valve which is open when electrically deenergized connected into each of the first and second wheel brake feed lines, wherein the at least one reservoir is connected to a hydraulic equalization line positioned at least partially within the hydraulics housing to form a connection to atmospheric pressure.

2. The auxiliary module as claimed in claim 1, wherein the pressure provision device comprises at least one pump which is driven by an electric motor and a suction side of the at least one pump is hydraulically connected to the respective reservoir.

3. The auxiliary module as claimed in claim 2, wherein the at least one reservoir for brake fluid comprises exactly two reservoirs for brake fluid, and the at least one pump comprises exactly two pumps, and wherein each of the two pumps is, at the suction side, hydraulically connected via a suction line to exactly one of the two reservoirs.

4. The auxiliary module as claimed in claim 2, wherein each pump is, at a respective pressure side, connected to a respective one of the first and second wheel brake feed lines which is connected to a hydraulic wheel brake.

5. The auxiliary module as claimed in claim 4, wherein, from the respective wheel brake feed line, a hydraulic return line branches off which is hydraulically connected to in each case one reservoir.

6. The auxiliary module as claimed in claim 5, wherein a return valve which is closed when electrically deenergized is connected into the respective return line.

7. The auxiliary module as claimed in claim 4, wherein the respective wheel brake feed line is connected to a pressure sensor which measures the pressure in the wheel brake feed line.

8. The auxiliary module as claimed in claim 2, configured such that a respective pump of the at least one pump draws in medium from the respective reservoir from the bottom.

9. The auxiliary module as claimed in claim 2, wherein a pipe is arranged in the at least one reservoir such that the pump draws in the brake fluid from the bottom of the at least one reservoir.

10. The auxiliary module as claimed in claim 1, comprising a hydraulics housing for the hydraulics unit, a motor housing, and an electronics housing.

11. The auxiliary module as claimed in claim 10, wherein the hydraulics housing is arranged between the electronics housing and the motor housing.

12. The auxiliary module as claimed in claim 3, wherein the two pumps are driven by a common electric motor.

13. The auxiliary module as claimed in claim 1, wherein the hydraulic equalization line lacks any valve therein.

14. The auxiliary module as claimed in claim 1, wherein the at least one reservoir for brake fluid comprises one reservoir for brake fluid for each of the at least two brakes, wherein each of the reservoirs are connected to the hydraulic equalization line to form the connection to atmospheric pressure.

15. An auxiliary module for an electrohydraulic brake assembly, for use in highly automated driving, comprising:
a hydraulics unit comprising a hydraulics housing with a pressure provision device provided at least partially within the hydraulics housing for building up pressure in at least two brakes,
a first wheel brake feed line configured to be connected to a first wheel brake line of the brake assembly,
a second wheel brake feed line configured to be connected to a second wheel brake line of the brake assembly, and
an isolating valve which is open when electrically deenergized connected into each of the first and second wheel brake feed lines, and
at least one reservoir for brake fluid within the hydraulics housing of the hydraulics unit,
wherein the pressure provision device comprises at least one pump which is driven by an electric motor and a suction side of the at least one pump is hydraulically connected to the respective reservoir,
wherein the at least one reservoir for brake fluid comprises exactly two reservoirs for brake fluid, and the at least one pump comprises exactly two pumps, and wherein each of the two pumps is, at the suction side, hydraulically connected via a suction line to exactly one of the two reservoirs, and
wherein a valve which is closed when electrically deenergized is connected into the respective suction line.

16. A brake assembly system, for highly automated driving, comprising a brake assembly, comprising:
hydraulically actuatable wheel brakes;
at least one electrically actuatable wheel valve for each wheel brake, for setting wheel-specific brake pressures;
a master brake cylinder which is connected and/or connectable to the wheel brakes;
a pressure medium reservoir tank which is at atmospheric pressure; and
an electrically controllable pressure provision device for the actuation of the wheel brakes, having a hydraulic pressure space, wherein the respective wheel brake is hydraulically connected to the pressure space by a wheel brake line; and
a module comprising:
a hydraulics unit with a pressure provision device for building up pressure in at least two brakes, and
at least one reservoir for brake fluid integrated into the hydraulics unit;
wherein the at least one reservoir is connected to a hydraulic equalization line which is provided for forming a connection to the atmosphere, and wherein the equalization line is connected to the pressure medium reservoir tank of the brake assembly,
wherein a first wheel brake line of the brake assembly opens into a first wheel brake feed line of the auxiliary module, and wherein a second wheel brake line of the brake system opens into a second wheel brake feed line of the auxiliary module, and wherein an isolating valve which is open when electrically deenergized is connected into the respective wheel brake feed line.

17. The brake assembly system as claimed in claim 16, wherein the equalization line is formed at least partially as a steel line.

18. The brake assembly system as claimed in claim 16, wherein the two wheel brake feed lines are connected to front-wheel brakes.

* * * * *